(12) United States Patent
Bauer

(10) Patent No.: US 10,357,129 B2
(45) Date of Patent: Jul. 23, 2019

(54) MAGNETIC VARIABLE LENGTH COOKING DIVIDER WITH ADJUSTABLE CONTACT

(71) Applicant: Justin Bauer, Solon, OH (US)

(72) Inventor: Justin Bauer, Solon, OH (US)

(*) Notice: Subject to any disclaimer, the term of this patent is extended or adjusted under 35 U.S.C. 154(b) by 301 days.

(21) Appl. No.: 15/452,666

(22) Filed: Mar. 7, 2017

(65) Prior Publication Data

US 2018/0255965 A1 Sep. 13, 2018

(51) Int. Cl.
*A47J 36/16* (2006.01)
*A47J 37/01* (2006.01)
*B65D 25/06* (2006.01)
*A47J 39/00* (2006.01)

(52) U.S. Cl.
CPC ............ *A47J 36/16* (2013.01); *A47J 37/01* (2013.01); *A47J 39/006* (2013.01); *B65D 25/06* (2013.01)

(58) Field of Classification Search
CPC .. A21B 3/13; A21B 3/135; A47F 5/005; A47J 27/13; A47J 36/16; A47J 37/01; A47J 37/049; A47J 37/067; A47J 37/108; A47J 39/006; B65D 25/06; B65D 25/08; Y10S 220/912
USPC .... 220/529, 530, 543, 550, 551, 552, 573.1, 220/575; 126/9 B; 249/158; 410/94, 410/129; 99/422, 423, 426; D7/357
See application file for complete search history.

(56) References Cited

U.S. PATENT DOCUMENTS

| | | | | |
|---|---|---|---|---|
| 348,839 | A | * | 9/1886 | Grosz ................... B65D 25/04 220/532 |
| 403,683 | A | | 5/1889 | Magruder |
| 1,232,939 | A | * | 7/1917 | Lively ................... B65D 25/04 220/529 |
| 1,290,186 | A | * | 1/1919 | Held ....................... A47J 36/20 126/9 B |
| 1,297,190 | A | * | 3/1919 | Lawson ................ A47B 88/90 220/551 |
| 1,610,963 | A | * | 12/1926 | Popper .................... A21B 3/13 220/529 |
| 1,713,328 | A | * | 5/1929 | Brenner ................. A47J 36/20 220/543 |
| 2,020,373 | A | | 11/1935 | Petzold, Jr. |

(Continued)

FOREIGN PATENT DOCUMENTS

| DE | 10208912 A1 * | 9/2003 | .......... A47J 37/108 |
|---|---|---|---|
| DE | 202014004383 U1 * | 7/2014 | .......... A47J 36/16 |
| DE | 102015213091 A1 * | 1/2017 | .......... A47J 36/16 |

*Primary Examiner* — Joshua E Rodden
(74) *Attorney, Agent, or Firm* — Robert Breetz

(57) ABSTRACT

The invention is an apparatus used to divide existing cooking equipment into isolated areas to substantially reduce fluid or physical contact for preparing one or more types of food at once, to maximize existing baking equipment versatility. Features of the apparatus are a housing component; one or more arm components which attach or reside within the housing component. The one or more arm components are configured to expand and retract from the housing component and adjust to the shape of various cooking equipment. The base of the housing component and a base of the one or more arm components are effectively in a same horizontal plane so cooking equipment may be effectively partitioned. Each component within the design contains a magnet that facilitates the invention's ability to affix to cookware containing ferrous materials.

15 Claims, 14 Drawing Sheets

(56) References Cited

U.S. PATENT DOCUMENTS

| | | | | |
|---|---|---|---|---|
| 2,148,681 | A | * | 2/1939 | Cameron ............. A01K 41/065 |
| | | | | 220/551 |
| 2,161,624 | A | * | 6/1939 | Hoerr .................... A21B 3/135 |
| | | | | 220/551 |
| 2,181,824 | A | | 6/1939 | Hoerr |
| 2,496,964 | A | | 2/1950 | Steinhauer |
| 2,658,643 | A | | 11/1953 | Miller |
| 2,663,449 | A | | 12/1953 | Smart |
| 5,074,777 | A | * | 12/1991 | Garner ..................... A21B 3/13 |
| | | | | 220/531 |
| 6,357,844 | B1 | | 3/2002 | Muterthies |
| 7,533,864 | B1 | * | 5/2009 | Reiser ...................... A21C 5/00 |
| | | | | 249/117 |
| D714,583 | S | * | 10/2014 | Kwon ............................ D7/354 |
| 2003/0137227 | A1 | * | 7/2003 | Hoenig ................. A47B 88/994 |
| | | | | 312/348.3 |
| 2009/0255891 | A1 | | 10/2009 | Lanning |
| 2014/0210331 | A1 | | 7/2014 | Tunzi |
| 2016/0316969 | A1 | * | 11/2016 | White ................... A47J 37/108 |
| 2018/0027823 | A1 | * | 2/2018 | Bauer .................... A21B 3/135 |

\* cited by examiner

SIDE VIEW

BOTTOM VIEW

ISOMETRIC VIEW

ISOMETRIC VIEW

TOP VIEW

SIDE VIEW

BOTTOM VIEW

MAGNETIC VARIABLE LENGTH COOKING DIVIDER WITH ADJUSTABLE CONTACT

FIELD

The present disclosure relates to the field of baking or cooking technology, and more specifically for techniques to provide a variable length cooking divider for baking trays into isolated areas to reduce and/or eliminate fluid and physical contact between foods.

BACKGROUND

Despite the practice of preparing meals in advanced existing since the creation of the refrigerator, it has yet to be taken to the extreme until recently. In mid-2014, the meal preparation phenomena exploded in popularity amongst bodybuilding communities and on social media platforms. For the first time, influencers in the industry were preparing anywhere from Five to Seven days' worth of food in one cooking session. Considering the ego and competitive nature within the bodybuilding community, social media became a competition platform to showcase how much food could be prepared at once.

Shortly thereafter, meal preparation became a commonly accepted practice within the bodybuilding community. But meal prep did not stop within this community alone; however, it has since expanded to nearly all health and fitness groups, people interested in nutrition and fat loss, and to busy individuals that realized the time saving and health benefit of preparing quality meals in advanced.

This idea behind the magnetic variable length cooking divider with adjustable contact was coalesced after an extended period of baking single-flavor chicken breasts in large quantities in order to prepare several meals in advanced, and noticing the psychological drawback to consuming the same flavor for consecutive meals. The idea behind the invention was to be able to prepare a large quantity of multi-flavored chicken breasts in a single piece of bakeware—but it soon became evident that there are several applications for this device.

DETAILED DESCRIPTION

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The divider may be used to create one or more isolated areas on existing baking equipment to greatly minimize physical and fluid contact between different foods while cooking. The detailed description will further describe each feature, starting with FIG. 1A, as purpose of discussion and illustration, and is not limiting with respect to any embodiment or with respect to the claims. The completed assembly may be seen in FIG. 5A and FIG. 5B.

Figure 1A:
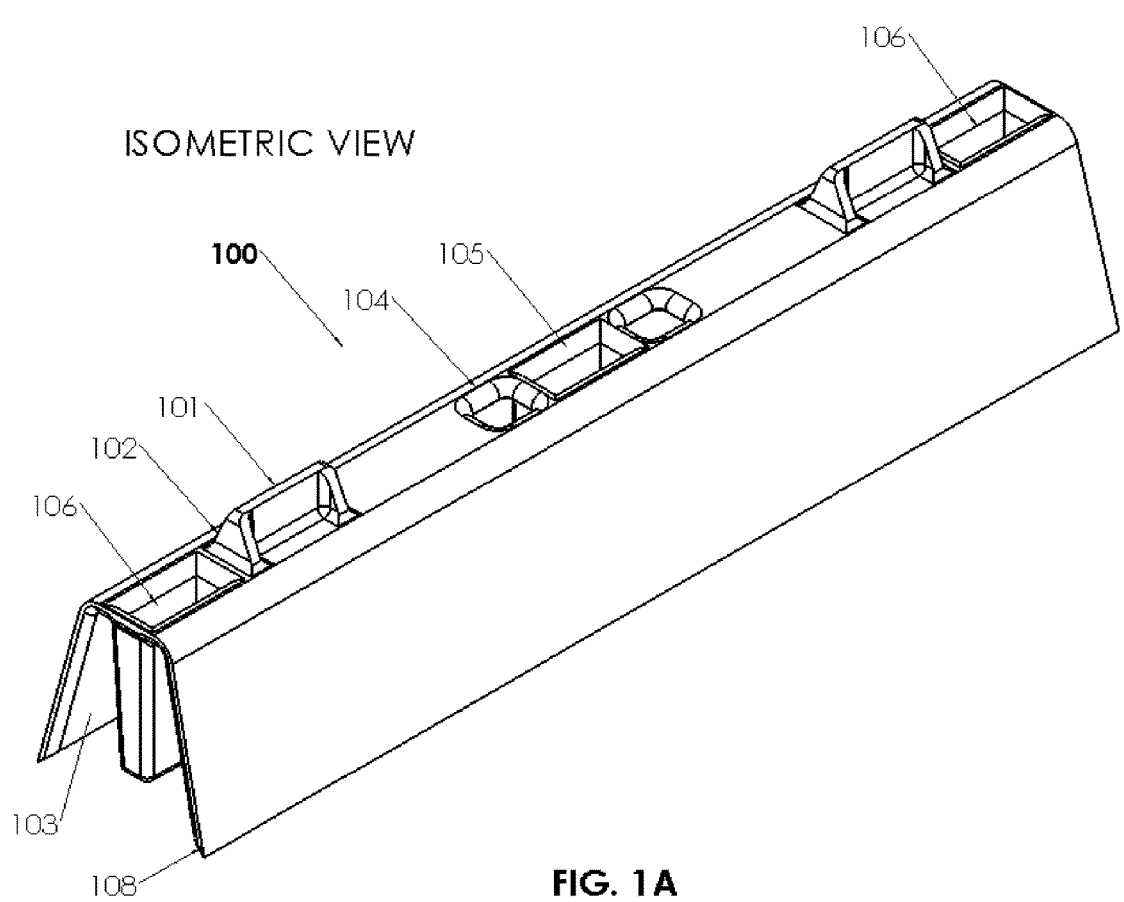
FIG. 1A is an isometric view drawing illustrating an exemplary housing component.

Referring to FIG. 1A, an exemplary housing component 100 is depicted. The housing component 100 comprises many of the features that allow the divider to effectively bisect existing baking equipment. A grip component 101 is a segment of additional material that partially extends along the housing component 100, and perpendicular to the baking equipment on which the divider will sit. The grip component 101 allows the user to easily interact with the divider in order to place the housing onto baking equipment prior to cooking, or allows the user to remove the housing component 100 for baking, cooking or other operations. In one embodiment, the gripping tabs and perpendicular to the ground. This structure assists the user in making solid contact with the divider by pinching the grip component 101 in an array of conditions. Said array of conditions may comprise in fluid-contact, oily, or dry conditions. In other embodiments the grip component 101 may be circumferential to the housing component 100, or contain additional features for simplified handling.

In FIG. 1A, a grip support 102 is an additional segment of material that extending from the housing component 100 to the grip 101 that provides structural support. The grip support 102 may also be beneficial in reducing the likelihood of damage to the grip component 101. The grip support 102 may comprise a tapered and angled design which may substantially increase the life of the manufacturing equipment.

Figure 1B:
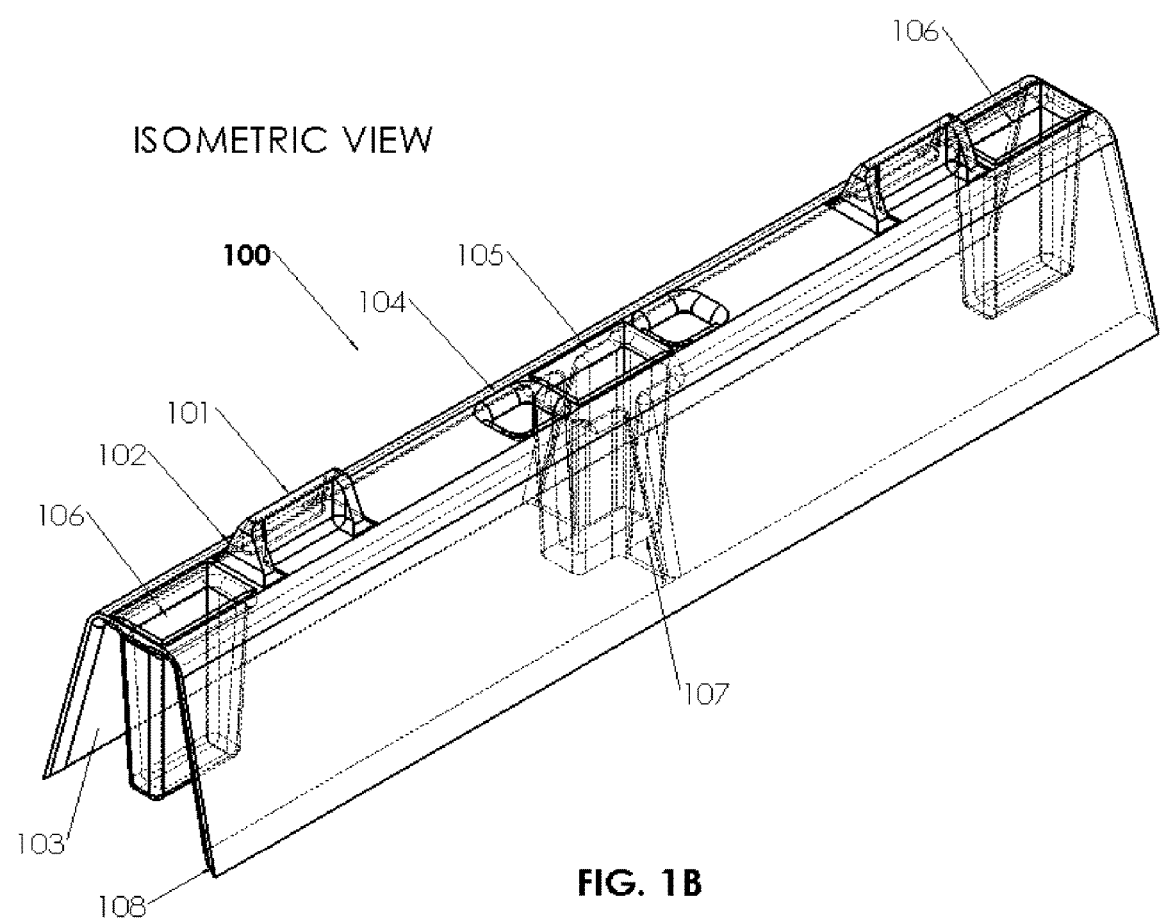
FIG. 1B is an isometric view drawing illustrating the exemplary housing component with hidden lines visible.

Referring to FIG. 1B, the housing component 100 is depicted with hidden lines and internal geometries visible. A central magnet pocket 105 is a material cavity with a thin wall thickness which allows for the placement of a magnet 300, seen in FIG. 5B. The magnet 300 allows the housing component 100 to affix to bakeware containing ferrous materials. The central magnet pocket 105 extends to the base of the housing component 100 in order to lessen the distance between magnet 300 and bakeware containing ferrous materials.

Referring to FIG. 1B, a housing support 107 comprises a plurality of triangular structural rib sections located between housing component 100 and center magnet pocket 105. The housing support 107 may assist with preserving the structural integrity of the housing component 100. The housing support 107 may provide the necessary rigidity to maintain quality of the design for room temperature or heated environments. The housing component 100 comprises a plurality of drafted edges, or tapered features, which may extend the life of the manufacturing equipment and reduces material cost, while maintaining the structural integrity of the design.

Figure 3A:
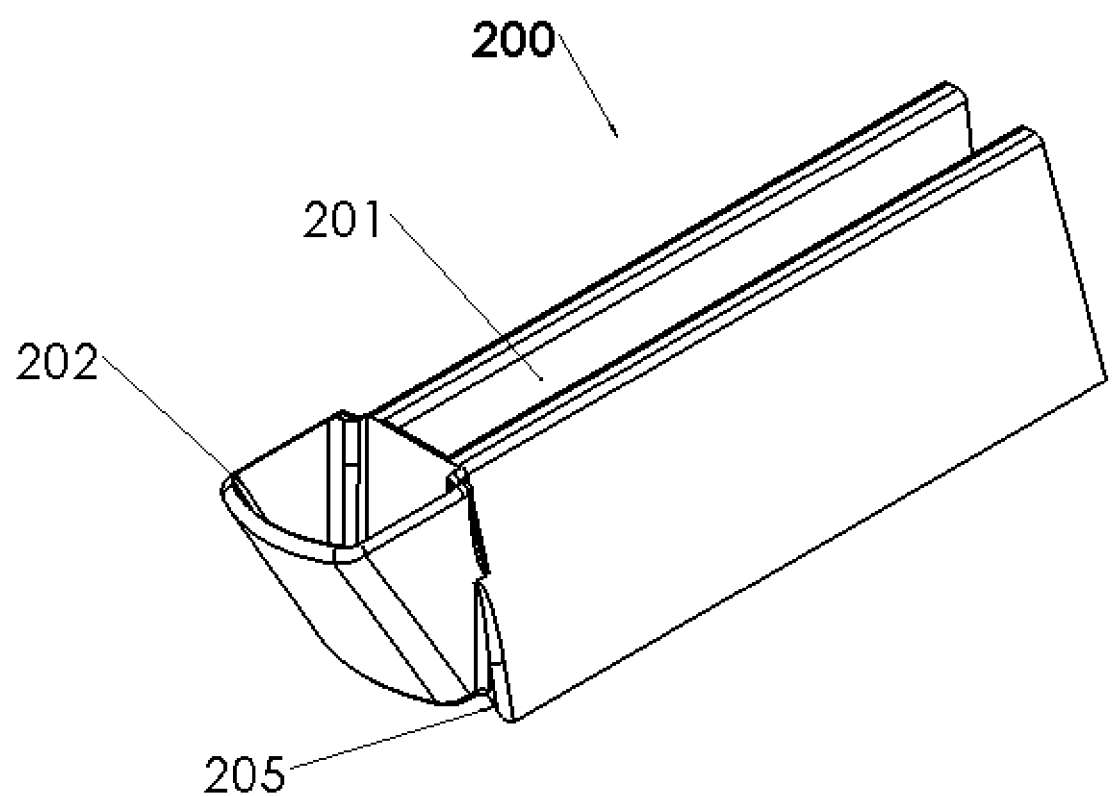
FIG. 3A is an isometric view drawing illustrating an exemplary arm component.

Referring to FIG. 1B, a housing cavity 103 is an hollow portion within the housing component 100 that may allow for the placement of an arm component 200, depicted in FIG. 3A, at a plurality of varying locations to effectively bisect baking equipment of varying dimensions. The arm component 200 may sit within the housing cavity 103 with a tight tolerance to reduce the amount of fluid and physical contact of food between the isolated areas of the baking equipment. In other embodiments the arm component 200 may have loose tolerances to allow for fluid movement between the areas of the baking sheet. The housing cavity 103 is designed to contain the arm component 200 for the sake of simple shipping and storage.

Figure 2A:
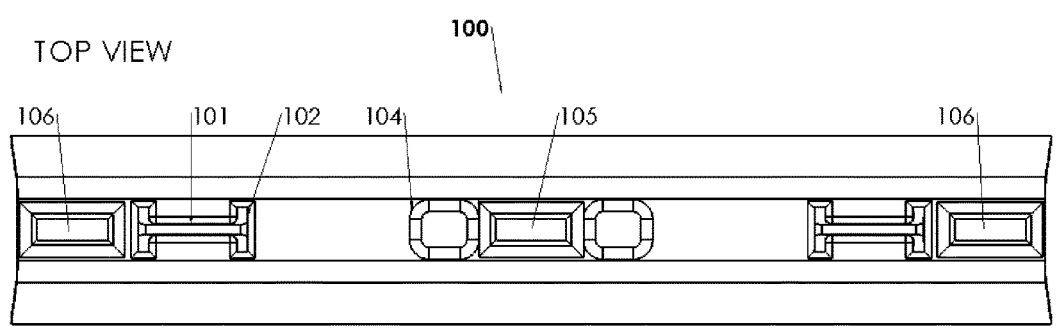
FIG. 2A is a top-view projection illustrating the exemplary housing component.

Referring to FIG. 2A, a plurality of ventilation holes 104 are depicted as apertures located at the top of housing component 100. The ventilation holes 104 allow the free-flow of oxygen between the housing cavity 103 and the surrounding environment, which prevents excess pressure or fume buildup. A plurality of side magnet pockets 106 are a material cavity with a thin wall thickness to contain the magnet 300. The side magnet pockets 106 do not completely extend to the base of housing component 100. There is a vertical gap between the bottom of side magnet pocket 106 and the baking substrate that allows space for the arm component 200 to slide within the housing component 100.

Figure 2B:
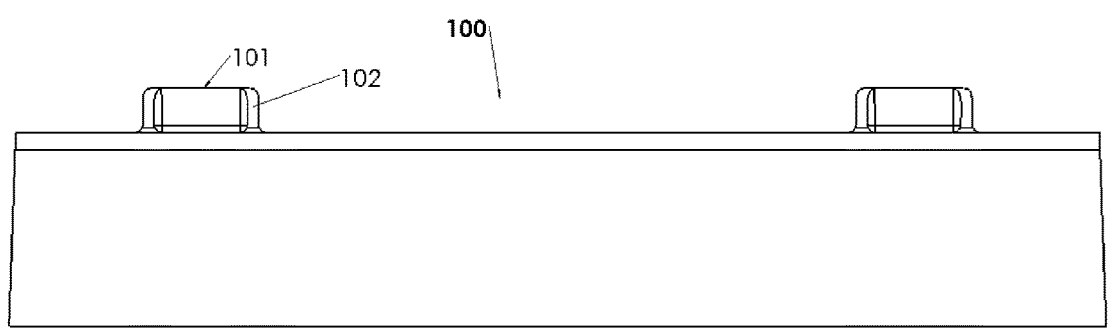
FIG. 2B is a side-view projection illustrating the exemplary housing component.
Figure 2C:
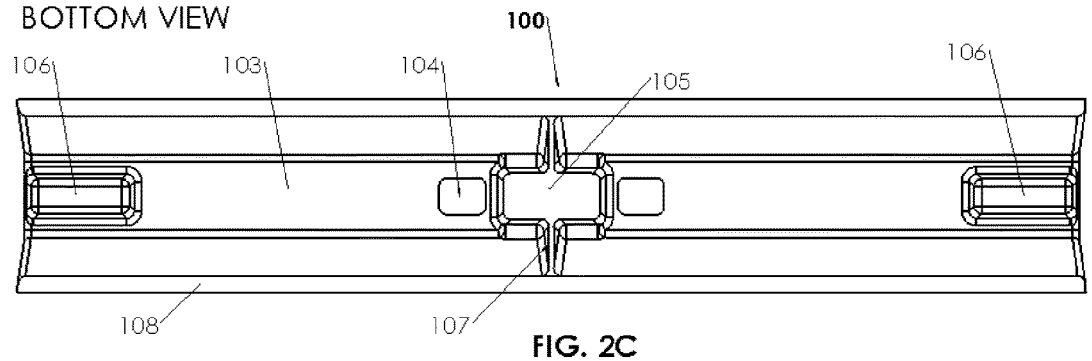
FIG. 2C is a bottom-view projection illustrating the exemplary housing component.

Referring to FIG. 2B, the side-view projection of the housing component 100 is depicted. Referring to FIG. 2C, a bottom-view projection of the housing component 100 is depicted. In this view, the side magnet pockets 106 and housing structural support 107 are best displayed.

Figure 2D:
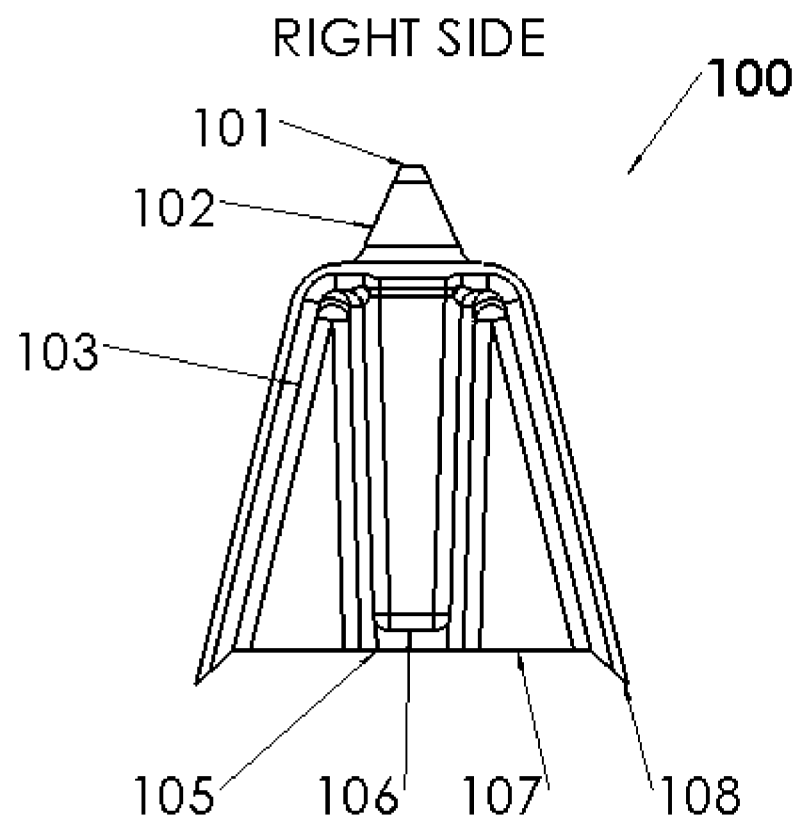
FIG. 2D is a right-view projection illustrating the exemplary housing component.

Referring to FIG. 2D, a housing sealing fin 108 is depicted as flexible fins made from silicone, protruding from the undersides of housing component 100 to contact the cooking substrate to improve the liquid-tight capabilities. The housing sealing fin 108 runs along the entire longitudinal axis of the housing component 100.

Referring to FIG. 3A, the arm component 200 is depicted. An adjustable wall contact 202 is located at one end of arm component 200 and may make contiguous contact with standard baking sheets, baking pans, or other cookware. The arm component 200 may have a structure to reinforce the contiguous contact of adjustable wall contact 202. In one embodiment, arm component 200 may have a hook-shaped design when viewed from a right-side perspective, that allows arm component 200 to wrap around the walls of the baking equipment to create a contact. Arm component 200 may also include clips, clamps, or other gripping devices to create contiguous contact with the baking equipment wall. Additional embodiments may include a tension system in which the arm component 200 is pushed into the walls of the baking equipment, through a spring, elastomer, or other resilient technology used for tension or absorption, in order to reinforce the contiguous contact.

Figure 4A:
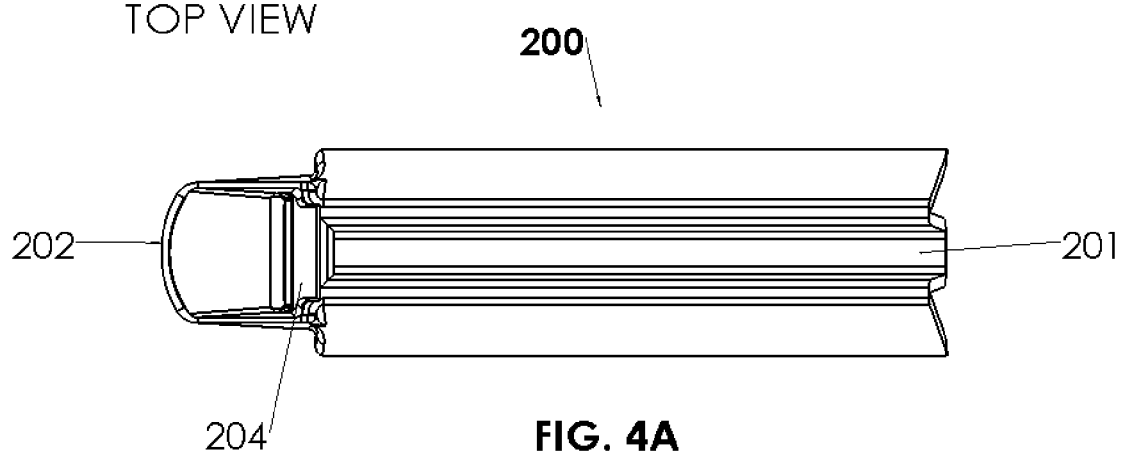
FIG. 4A is a top-view projection illustrating the exemplary arm component.

Referring to FIG. 3A, a magnet pocket channel 201 is a recessed material groove located at the center of arm component 200. As depicted in FIG. 4A, the magnet pocket channel 201 extends from the adjustable wall contact 202 to the opposite end of the arm component 200 along the longitudinal axis, and serves as a guiding track for the telescoping capabilities of the invention. Alternatively, there may be a plurality of grooves on the arm components.

Figure 3B:
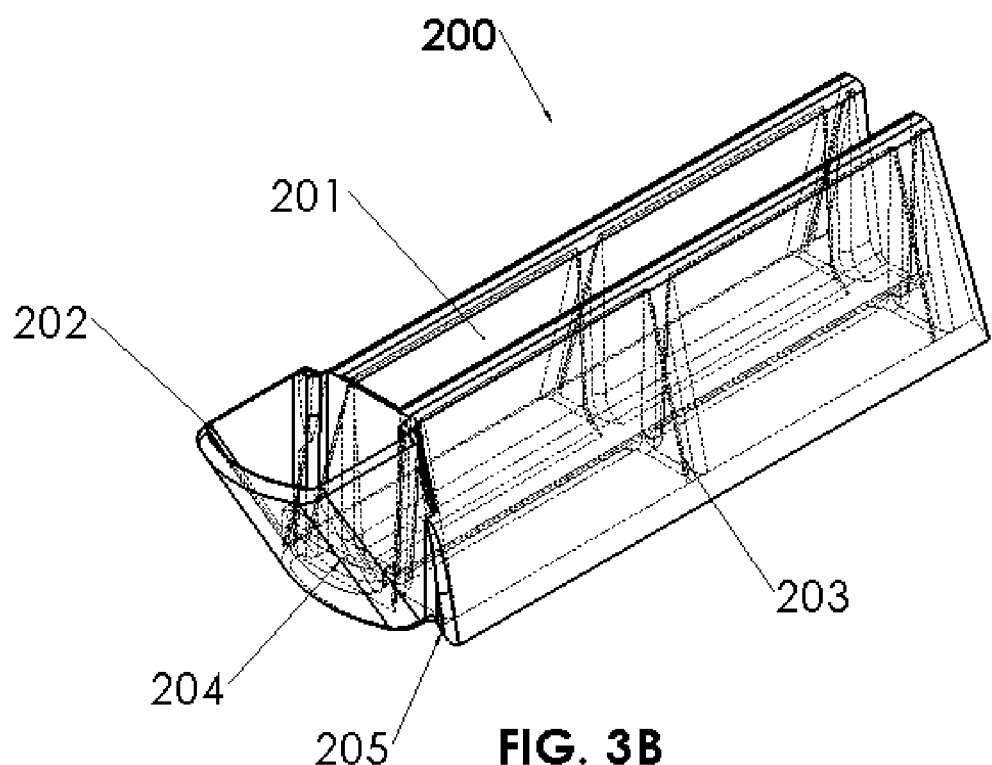
FIG. 3B is an isometric view drawing illustrating the exemplary arm component with hidden lines visible.

An arm structural support 203, illustrated in FIG. 3B, is a material rib structural support which maintains the rigidity of the arm component 200 and provides additional structural integrity. Similar to the housing structural support 107, the arm structural support 203 features a plurality of drafted edges to increase cycle life of the manufacturing equipment.

Figure 4B:
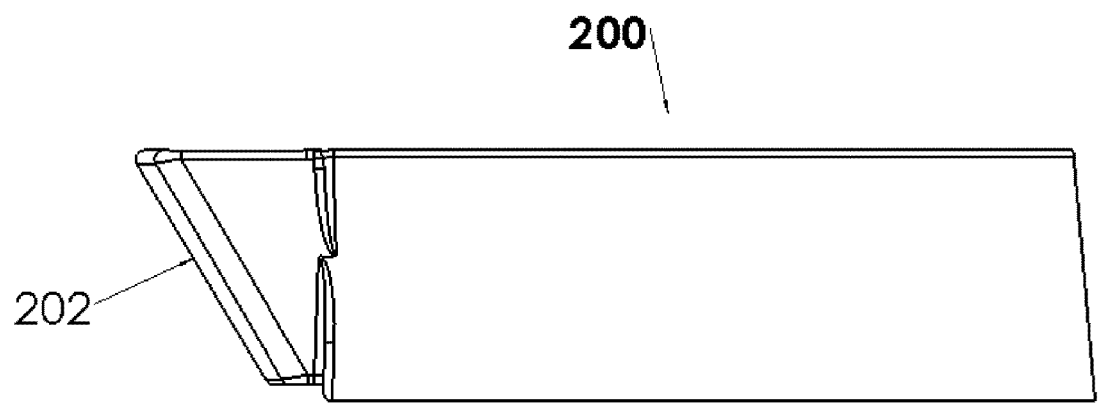
FIG. 4B is a right-view projection illustrating the exemplary arm component with hidden lines visible.
Figure 4C:
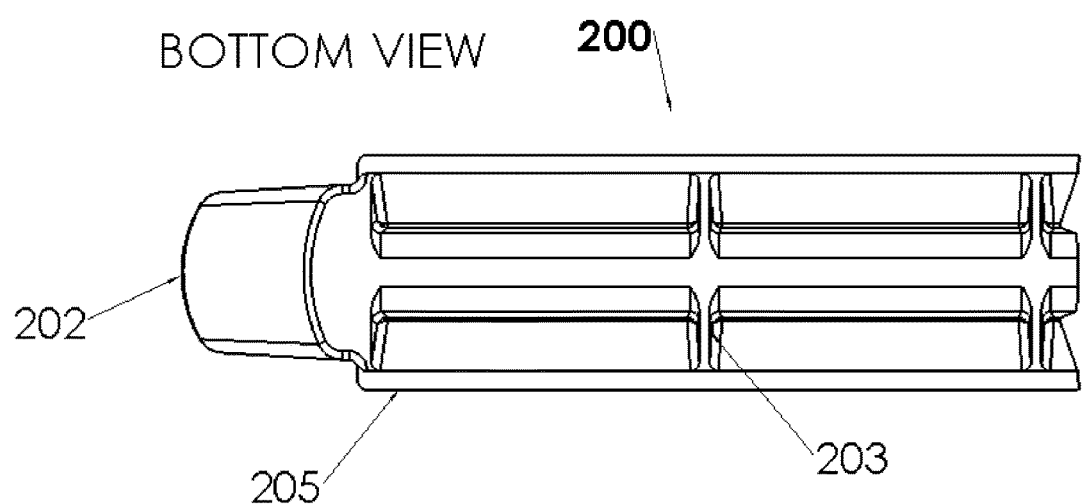
FIG. 4C is a bottom-view projection illustrating the exemplary arm component.

Referring to FIG. 4A, an arm magnet pocket 204 is a recessed aperture within the material of the arm component 200. The magnet 300 will be placed within the arm magnet pocket 204, and is used to create a compressive force between the arm component 200 and the bakeware containing ferrous materials. This allows the adjustable wall contact 202 to adjust and make contiguous contact with bakeware while preventing or reducing the fluid and physical contact of food on partitioned cooking surface. In observing the side profile of the arm component 200, depicted in FIG. 4B, the adjustable wall contact 202 will contact the baking sheet wall at a plurality of angles. This is made possible by the cup-shaped feature of adjustable wall contact 202, that when viewed from the bottom-view projection depicted in FIG. 4C, contains excess pliable material that bows outwards upon application of force, modifying the angle of incidence.

Figure 4D:
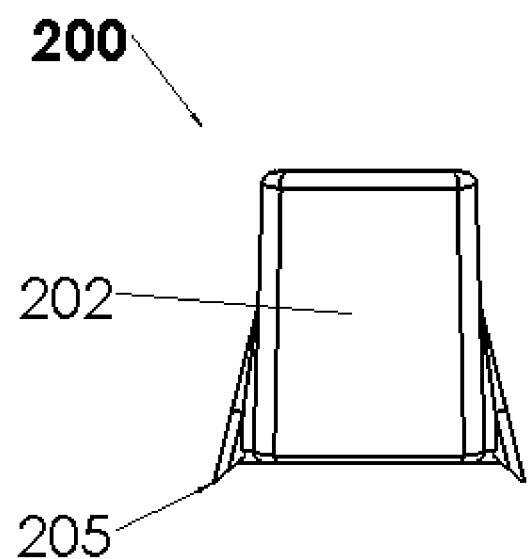
FIG. 4D is a side-view projection illustrating the exemplary arm component.

Referring to FIG. 4D, a plurality of arm sealing fins 205 are depicted in the side view of arm component 200. Similar to the housing sealing fins 108, the arm sealing fins are flexible fins made from silicone, protruding from the undersides of the arm component 200 to contact the cooking substrate to improve the liquid-tight capabilities. The arm sealing fins 205 runs along the entire longitudinal axis of the arm component 200.

Figure 5A:
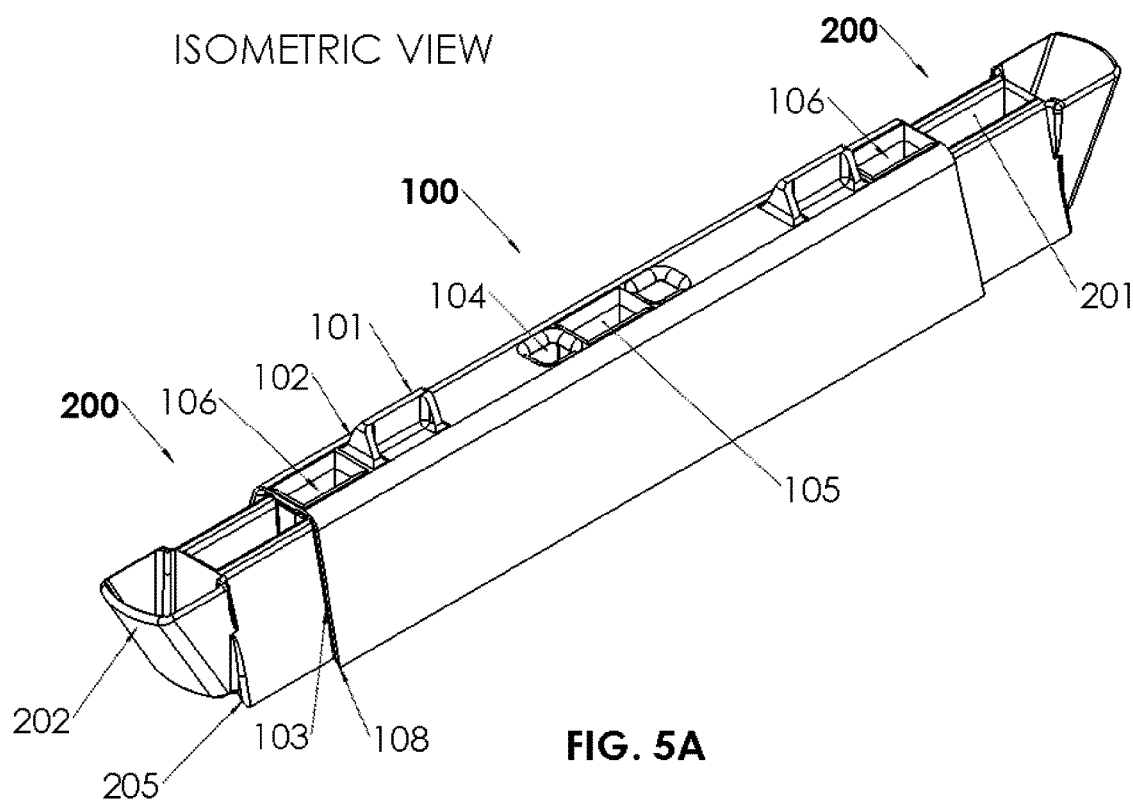
FIG. 5A is an isometric view drawing illustrating an exemplary completed assembly comprising the exemplary housing component and two exemplary arm components.

Referring to FIG. 5A, an exemplary completed assembly, consisting of housing component 100 and a plurality of arm component 200, is displayed. The arm component 200 sits within the housing component 100, and may expand or retract to contact or partially contact a wall of the baking equipment to effectively create two or more isolated areas for baking.

Figure 5B:
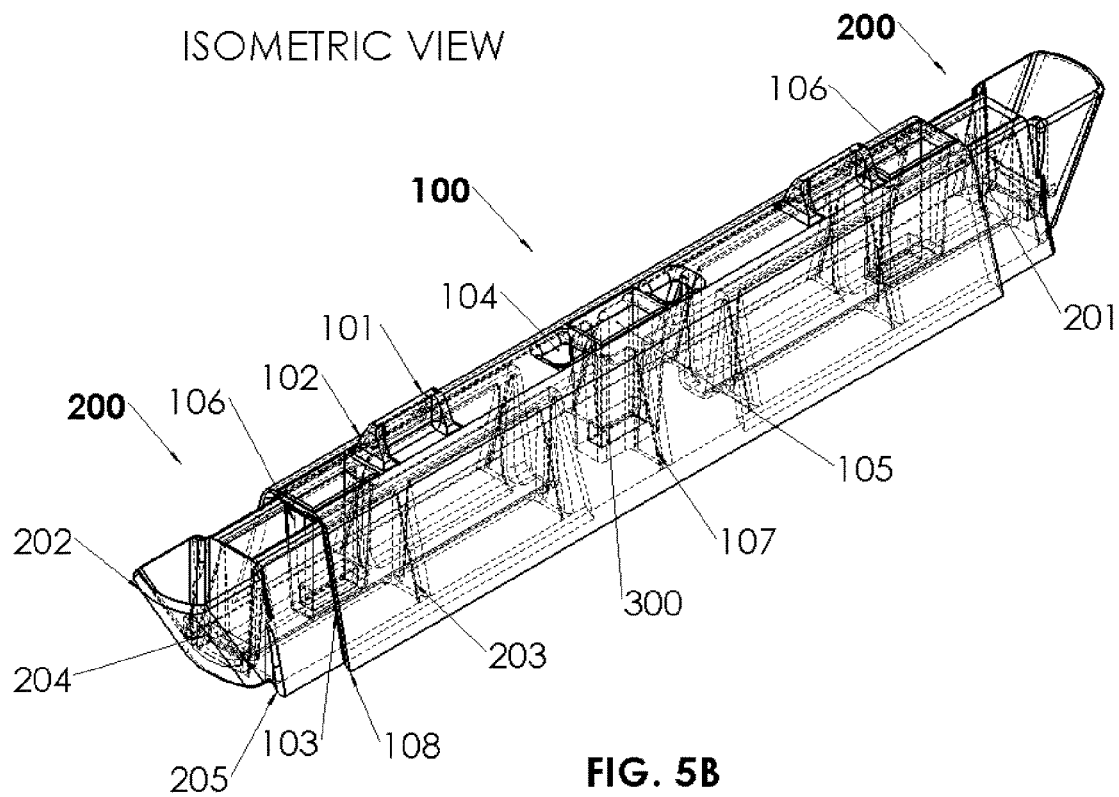
FIG. 5B is an isometric view drawing illustrating the exemplary completed assembly comprising the exemplary housing component and two exemplary arm components with hidden lines visible.

In FIG. 5B, the tight tolerances between the housing cavity 103 and the arm component 200 are observed. Components are designed with interior or exterior rounded geometries for tight tolerances and to prevent crevasses for leaking or areas that are susceptible to food particulate buildup. Alternatively, loose tolerances may be used to reduce the friction between the housing component 103 and the arm component 200 to allow for easy adjustment of the invention.

Referring to FIG. 5B, each magnet 300, located within each side magnet pocket 106, will pull the housing component 100 and arm component 200 towards the cooking substrate containing ferrous materials. In having multiple instances of the magnet 300 located within the invention, it is possible to create a seal on warped or cambered cookware containing ferrous materials.

Figure 4E:
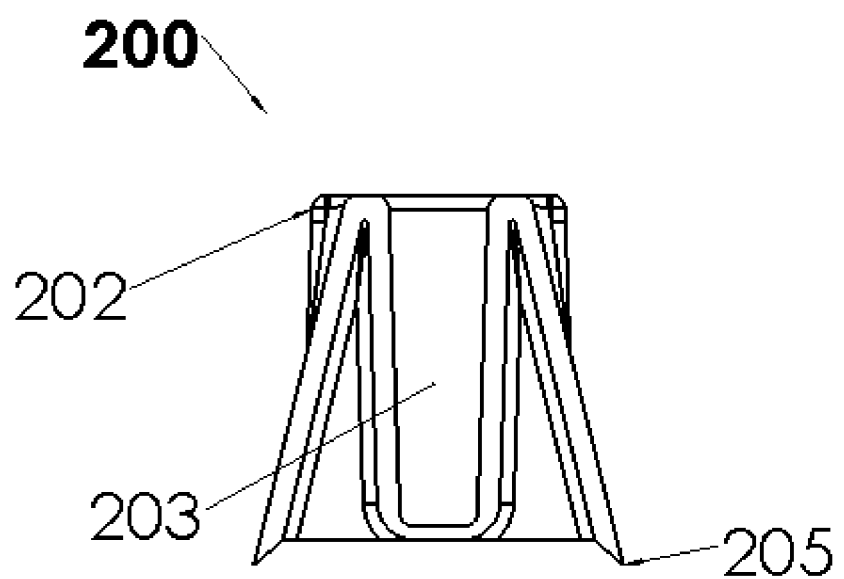
FIG. 4E is a rear-view projection illustrating the exemplary arm component.

Referring to FIG. 5B, the interaction between the magnet pocket channel 201 and the side magnet pockets 106 is best depicted. The magnet channel 201 and side magnet pockets 106 allow for the telescopic extension to create partitions on cookware of various length, while maintaining the structure of the completed assembly and the seal on the cooking substrate. Best depicted in FIG. 4E, the material groove of the magnet pocket channel 201 connects to the side magnet pocket 106. The magnet pocket 106 of the central housing component 100 can contact the magnet pocket channel 201 of one of the arm components 200 at a plurality of locations as depicted in FIG. 7A and FIG. 7B.

Figure 6A:
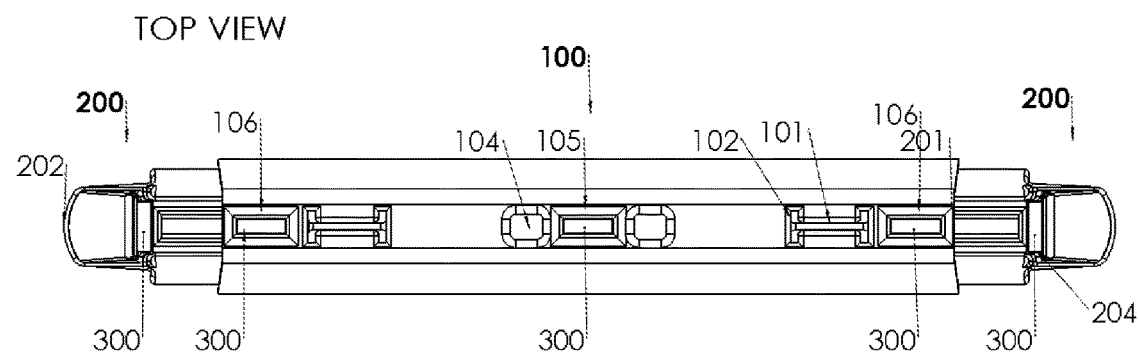
FIG. 6A is a top-view projection illustrating the exemplary completed assembly.
Figure 6B:
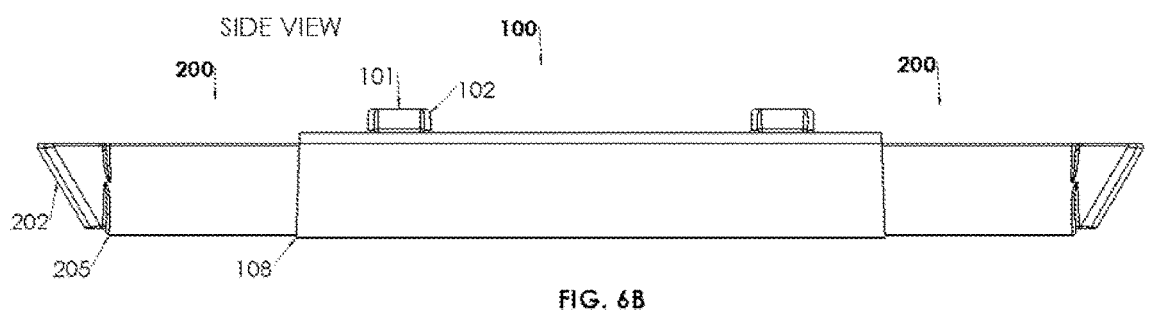
FIG. 6B is a side-view projection illustrating the exemplary completed assembly with hidden lines visible.
Figure 6C:
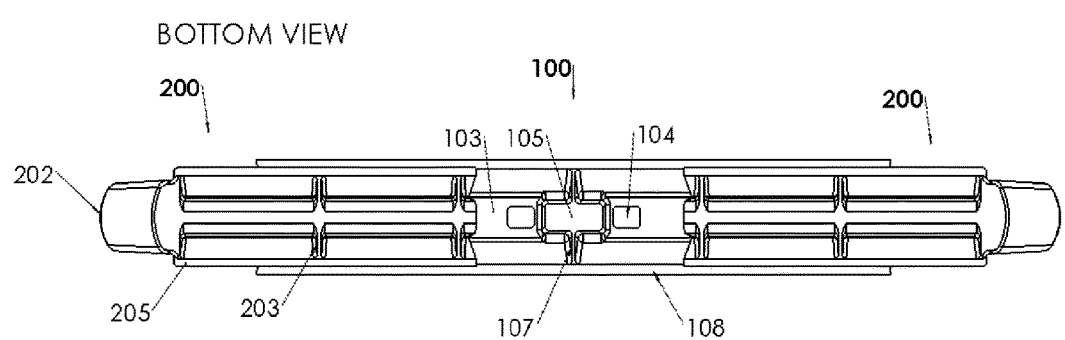
FIG. 6C is a bottom-view projection illustrating the exemplary completed assembly with hidden lines visible.
Figure 6D:
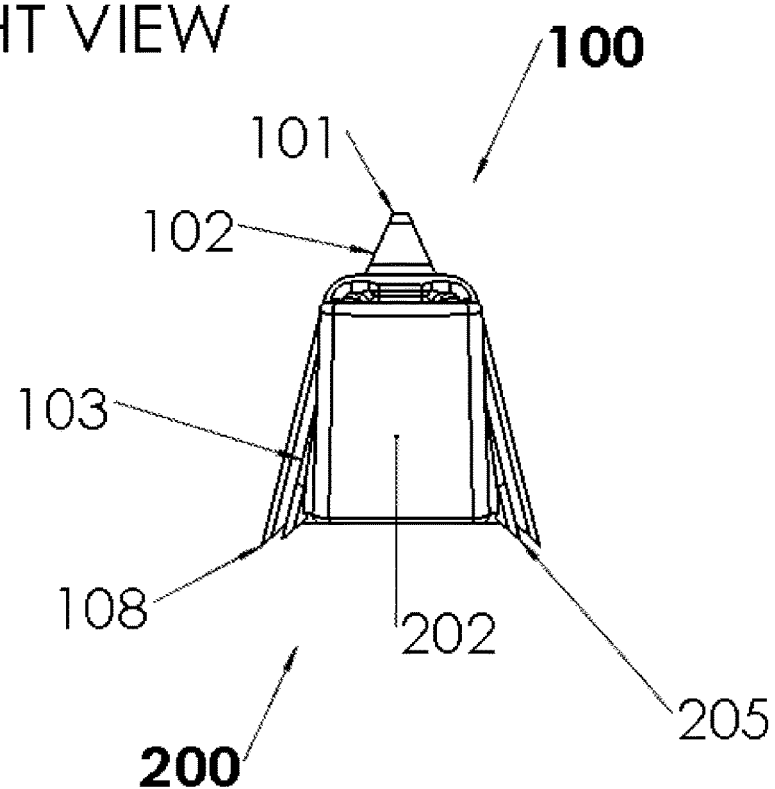
FIG. 6D is a right-view projection illustrating the exemplary completed assembly with hidden lines visible.

Referring to FIG. 6A, the top-view projection of the completed assembly shows two instances of arm component 200 within housing cavity 103. Referring to FIG. 6B, the housing sealing fins 108 and arm sealing fins 205 may appear lower than the housing component 100 and arm component 200, It is noted here that all components sit level with the surface, due to the flexible nature of the material and the design of the fins to flare out. Best depicted in FIG. 6C and FIG. 6D, the design of the arm component 200 completely fills the geometry of the housing cavity 103.

Figure 7A:
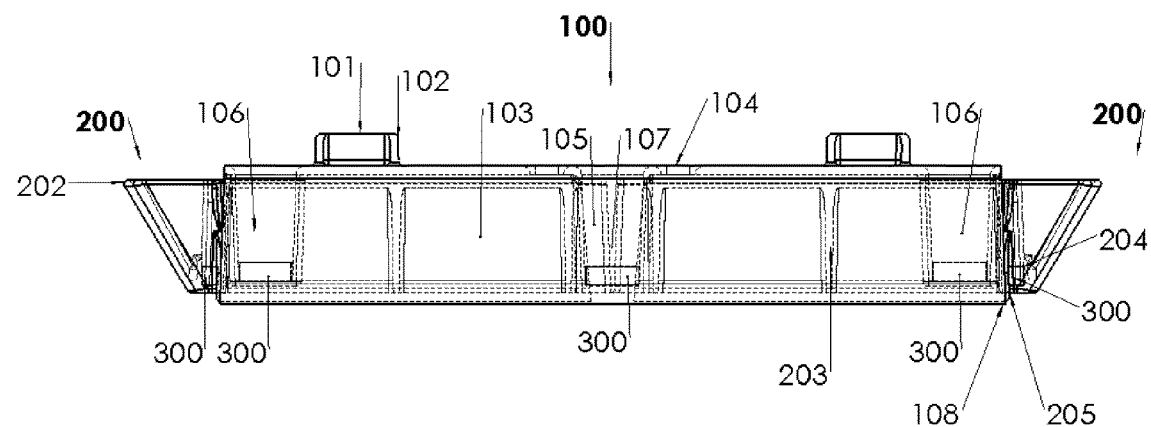
FIG. 7A is a side-view projection illustrating the exemplary completed assembly with hidden lines visible showing the exemplary two arms in a retracted position.
Figure 7B:
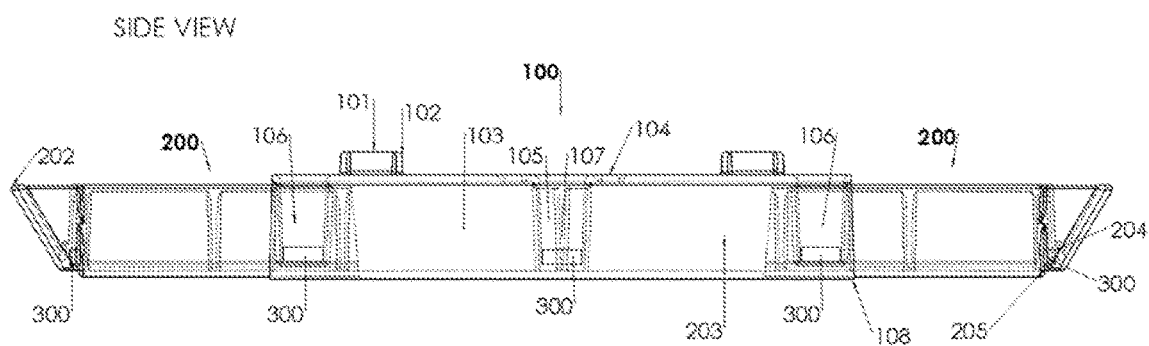
FIG. 7B is a side-view projection illustrating the exemplary completed assembly with hidden lines visible showing the exemplary two arms in an extended position to bisect a baking sheet.

Referring to FIG. 7A, the arm component 200 is displayed within housing cavity 103 and displays the ability of arm component 200 to telescope in or out of housing cavity 103 that allows the completed assembly to reach various lengths. FIG. 7A and FIG. 7B most clearly display the expanding capabilities of the divider that allows the completed assembly to isolate baking space and make contiguous contact with the baking sheet walls. The adjustable wall contact 202 is oriented to face away from the housing and allows for adjoining contiguous contact of baking sheet walls. FIG. 7A displays the arm component 200 sitting inside of housing cavity 103 in a retracted position. In FIG. 7B, the majority of arm component 200 is exposed, emphasizing expanding feature of arm component 200 changing the overall length of the divider and bisecting baking equipment of varying length.

In one embodiment of the invention, the housing component 100 and arm component 200 are comprised of silicone or other inert, synthetic polymer. A silicone-based divider may provide advantages in regards to economical manufacturing cost and simplified compliance with federal drug administration (FDA) and the Lebensmittel- and Futtermittelgesetzbuch (LFGB), the European food standard, regulations. In another embodiment, the housing and arm components are made of a metal such as aluminum which may provide rigidity of the divider. Further embodiments may include a combination of a synthetic polymer and metal materials. An exemplary embodiment comprising synthetic polymer and metal materials may be used to create a divider that is non-stick, FDA and LFGB compliant, rigid, and economical to manufacture. Additional embodiments may entail a magnet being paced within the silicone during the manufacturing process.

Various embodiments of the invention have been described herein. These embodiments are given only by a way of example are not intended to limit the scope of the invention. The scope of the invention is not limited to the materials, dimensions, shapes, configurations, etc. described here. The various features of the embodiments may be combined in numerous ways to produce additional embodiments.

For instance, housing component 100, featured in FIG. 5B, may have multiple cavities wherein additional instances of arm components may be placed. One embodiment may include four cavities with telescoping arms, giving the divider a plus-shape, or cross when observed from a top view orientation. Various embodiments may also create more or less isolated cooking areas in several configurations to meet the dimensions of any equipment that requires isolation. Another embodiment may include a fixed-length design. Another embodiment may include a plurality of arm components arranged in a grid geometry.

The embodiments described are not meant to be an exhaustive presentation of the ways in which the invention could be designed. Elements described with respect to one embodiment can be implemented in other embodiments even when not described in such embodiments unless otherwise noted. Although a dependent claim may refer in one or more of the claims, other embodiments can also include a combination of the dependent claim with the subject matter of each other dependent claim or a combination or one or more features with other dependent or independent claims. Furthermore, it is intended also to include features of a claim in any other independent claim even if this claim is not directly made dependent to the independent claim.

For purposes of interpreting the claims for the present invention, it is expressly intended that the provisions of Section 112, sixth paragraph of 35 U.S.C. are not to be invoked unless the specific terms "means for" or "step for" are recited in a claim.

Although the invention has been illustrated and described with respect to one or more implementations, alterations and/or modifications may be made to the illustrated examples without departing from the spirit and scope of the appended claims.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Example 1 is a cooking apparatus made of silicone and the like, and having at least two adjustable parts used to divide an existing, planar, cooking substrate into isolated areas to reduce and/or eliminate fluid and/or physical contact between foods, the apparatus comprising: a central housing component comprising a trapezoidal structure; an at least one arm component attached to the central housing component, the at least one arm component being configured to expand and retract from the central housing component; and wherein a base of the housing component and a base of the one or more arm components being aligned in the same longitudinal axis.

Example 2 is the apparatus of example 1 or any of the above examples, wherein the at least one arm component comprise at least one adjustable, telescopic extension, wherein the at least one arm component is slidably adjusted and operatively connected to a plurality of grooves in the central housing component and move distal to one another.

Example 3 is the apparatus of example 1 or any of the above examples, wherein the at least one arm component and the central housing component each have one or more apertures to receive at least one magnet disposed at each end located distally of the central housing component to selectively affix the apparatus to a plurality of cooking substrates Example 4 is the apparatus of example 1 or any of the above examples, wherein the at least one arm component has a cup-shaped, and flexible nose section protruding outwards from the longitudinal axis on an end distally located from the central housing component to conform to a plurality of baking substrate walls creating a seal.

Example 5 is the apparatus of example 1 or any of the above examples further comprising: a grip component partially extending along the central housing component, wherein the grip component is perpendicular to the base of the central housing component; and a grip support feature to attach the grip component to the central housing component; wherein the central housing component also comprising at least two ventilation apertures at its center.

Example 6 is the apparatus of example 1 or any of the above examples further comprising: at least two ventilation apertures proximal to the central housing component.

Example 7 The apparatus of example 1, wherein the one or more arm components comprise an arm support of triangular geometry with a plurality of flexible fins, wherein the flexible fins are made from silicone, and protrude from their undersides in contact with the cooking substrate creating a liquid-tight seal, wherein the flexible fins are located on each corner of the base of the central housing component and run along the longitudinal axis of the one or more arm component.

Example 8 is the apparatus of example 1 or any of the above examples further comprising: a trapezoidal-shaped, central housing component with internal grooves to receive the one or more arm component; wherein the central housing component has a plurality of flexible fins, wherein the flexible fins are made from silicone, and protrude from its undersides in contact with the cooking substrate creating a liquid-tight seal, wherein the fins are located on each corner of the base of the central housing component and running along the longitudinal axis of the central housing component.

Example 9 is the apparatus of example 1 or any of the above examples, wherein the central housing component has an at least one aperture to receive a magnet allowing the apparatus to be selectively affixed to a plurality of cooking substrates having ferrous materials.

Example 10 is the apparatus of example 1 or any of the above examples, wherein the one or more arm components and the central housing component are made at least partially of silicone or another synthetic polymer and the like.

Example 11 is the apparatus of example 1 or any of the above examples, wherein the one or more arm components are arranged in a plus-shape.

Example 12 is the apparatus of example 1 or any of the above examples, wherein the one or more arm components comprise a tensioning system to adjust the one or more arm components radially outward from the center of the central housing component.

Example 13 is the apparatus of example 1 or any of the above examples, wherein the one or more arm components comprise a gripping device to grasp onto an external structure such as the wall of a baking pan.

What is claimed is:

1. A cooking apparatus to divide an existing, planar, cooking substrate into isolated areas to reduce and/or eliminate fluid and physical contact between foods, the apparatus comprising:
    a central housing component comprising a trapezoidal structure;
    one or more arm components attached to the central housing component, the one or more arm components being configured to expand and retract from the central housing component;
    wherein a base of the housing component and a base of the one or more arm components being aligned in a same longitudinal axis, and
    wherein the one or more arm components and the central housing component each have one or more apertures to receive at least one magnet disposed at each end located distally of the central housing component to selectively affix the apparatus to a plurality of cooking substrates.

2. The apparatus of claim 1, wherein the one or more arm components comprises at least one adjustable, telescopic extension, wherein the one or more arm components is adjusted and operatively connected to a pocket in the central housing component and move distal to one another.

3. A cooking apparatus, the apparatus comprising:
    a central housing component comprising a trapezoidal structure;
    one or more arm components attached to the central housing component, the one or more arm components being configured to expand and retract from the central housing component;
    wherein a base of the housing component and a base of the one or more arm components being aligned in a same longitudinal axis, and
    wherein the one or more arm components has a pliable cup-shaped flexible section protruding outwards from the longitudinal axis on an end distally located from the central housing component to conform to a plurality of baking substrate walls creating a seal.

4. The apparatus of claim 1 further comprising:
    a grip component partially extending along the central housing component, wherein the grip component is perpendicular to the base of the central housing component; and
    a grip support feature to attach the grip component to the central housing component; wherein the central housing component also comprising at least two ventilation apertures at its center.

5. The apparatus of claim 1 further comprising:
    at least two ventilation apertures proximal to the central housing component.

6. A cooking apparatus, the apparatus comprising:
a central housing component comprising a trapezoidal structure;
one or more arm components attached to the central housing component, the one or more arm components being configured to expand and retract from the central housing component;
wherein a base of the housing component and a base of the one or more arm components being aligned in a same longitudinal axis, and
wherein the one or more arm components comprise an arm support of triangular geometry with a plurality of flexible fins, wherein the flexible fins are made from silicone, or other elastomer, and protrude from the underside of the arm component in contact with the cooking substrate creating a liquid-tight seal, wherein the flexible fins run along the longitudinal axis of the one or more arm component.

7. The apparatus of claim 1 wherein the central housing component has internal grooves to receive the one or more arm component; wherein the central housing component has a plurality of flexible fins, wherein the flexible fins are made from silicone, and protrude from the underside of the central housing component in contact with the cooking substrate creating a liquid-tight seal, wherein the fins are located on each corner of the base of the central housing component and running along the longitudinal axis of the central housing component.

8. The apparatus of claim 1, wherein the central housing component has an at least one central aperture to receive a magnet allowing the apparatus to be selectively affixed to a plurality of cooking substrates having ferrous materials.

9. The apparatus of claim 1, wherein the one or more arm components and the central housing component are made at least partially of silicone or another synthetic polymer.

10. The apparatus of claim 1, wherein the one or more arm components are arranged in a plus-shape.

11. The apparatus of claim 3, wherein the one or more arm components are arranged in a plus-shape.

12. The apparatus of claim 3, wherein the one or more arm components comprises at least one adjustable, telescopic extension, wherein the one or more arm components is adjusted and operatively connected to a pocket in the central housing component and move distal to one another.

13. The apparatus of claim 3, wherein the one or more arm components comprise an arm support of triangular geometry with a plurality of flexible fins, wherein the flexible fins are made from silicone, or other elastomer, and protrude from the underside of the arm component in contact with the cooking substrate creating a liquid-tight seal, wherein the flexible fins run along the longitudinal axis of the one or more arm component.

14. The apparatus of claim 3, wherein the central housing component has internal grooves to receive the one or more arm component; wherein the central housing component has a plurality of flexible fins, wherein the flexible fins are made from silicone, and protrude from the underside of the central housing component in contact with the cooking substrate creating a liquid-tight seal, wherein the fins are located on each corner of the base of the central housing component and running along the longitudinal axis of the central housing component.

15. The apparatus of claim 3 further comprising:
a grip component partially extending along the central housing component, wherein the grip component is perpendicular to the base of the central housing component; and
a grip support feature to attach the grip component to the central housing component; wherein the central housing component also comprising at least two ventilation apertures at its center.

* * * * *